UNITED STATES PATENT OFFICE.

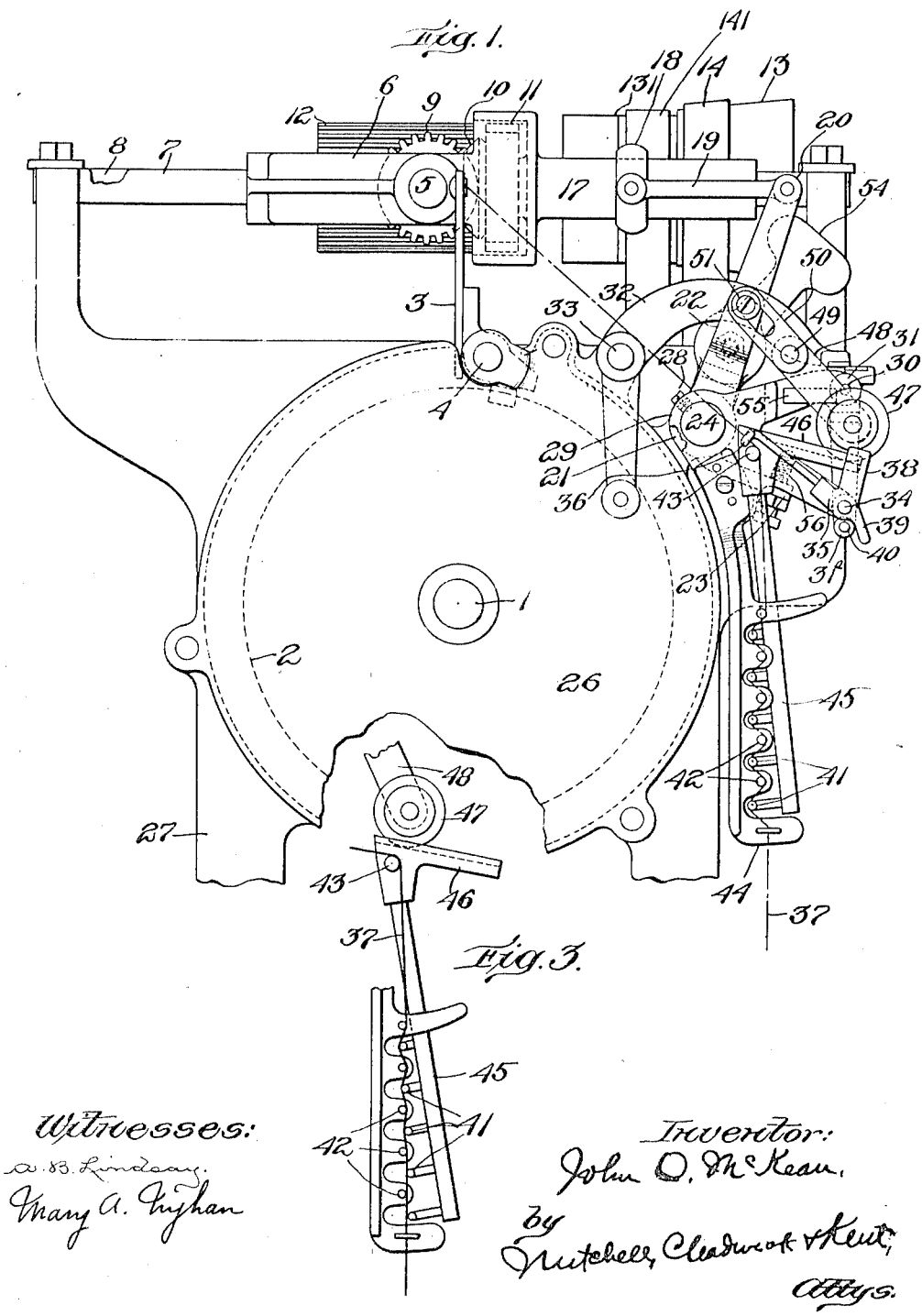

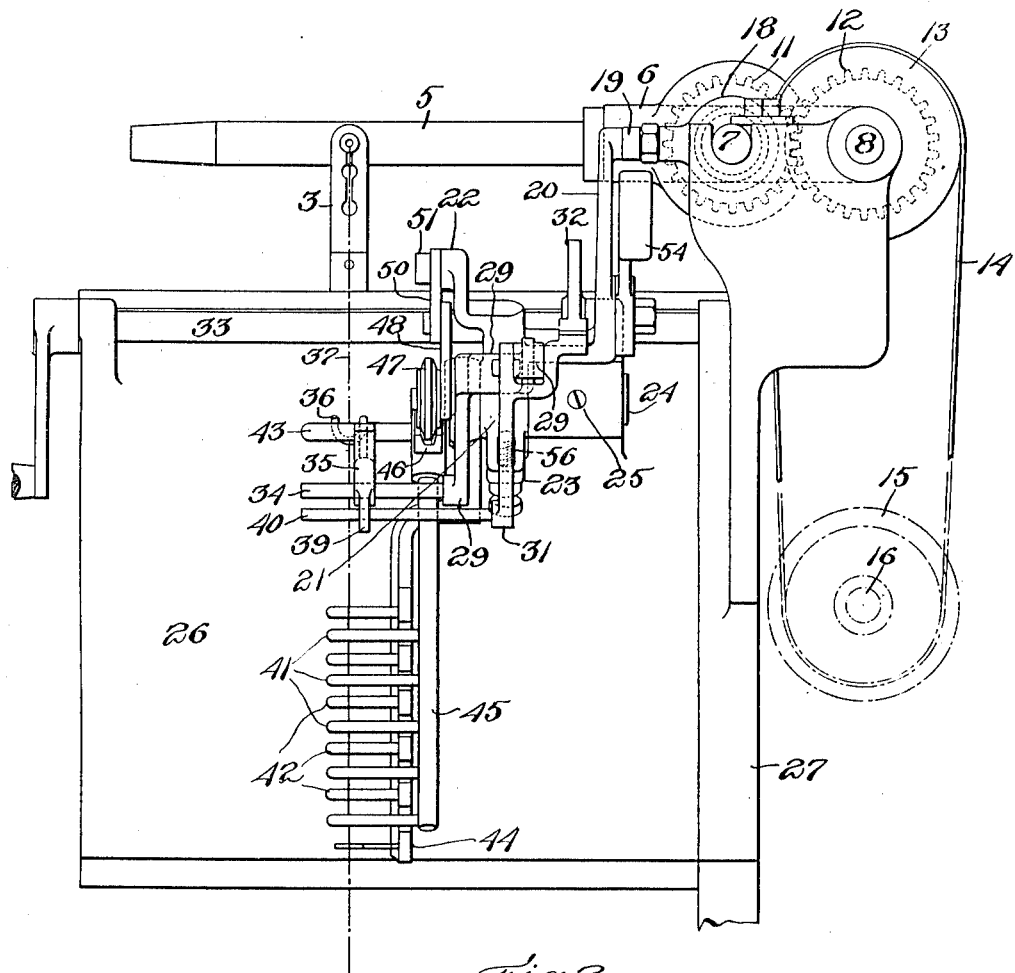

JOHN O. McKEAN, OF WESTFIELD, MASSACHUSETTS, ASSIGNOR TO FOSTER MACHINE COMPANY, OF WESTFIELD, MASSACHUSETTS, A CORPORATION OF MAINE.

WINDING-MACHINE.

1,063,992.  Specification of Letters Patent.  Patented June 10, 1913.

Application filed December 27, 1911. Serial No. 668,138.

*To all whom it may concern:*

Be it known that I, JOHN O. MCKEAN, a citizen of the United States, residing at Westfield, in the county of Hampden and State of Massachusetts, have invented new and useful Improvements in Winding-Machines, of which the following is a specification.

My invention relates to winding machines and it has for its object to provide an improved machine of this kind.

The invention consists in the novel features of construction and combination of parts set forth in the following description and particularly pointed out in the claims at the close thereof.

In the accompanying drawings: Figure 1 is an end view, partly broken away, of a winding machine constructed in accordance with my invention; Fig. 2 is a partial front elevation of the winding machine shown in Fig. 1; and Fig. 3 is a detail hereinafter described.

Having reference to the drawing 1 represents the cam shaft of the machine on which is fixed a cam drum 2 for reciprocating the thread guide 3. The thread guide 3 is mounted upon a guide rod 4 fixed to the frame of the machine and is shifted back and forth lengthwise of a cop holding spindle 5 by cam 2, so that as the cop (not shown) rotates with spindle 5 on which it is mounted, the guide 3 lays the thread thereon. Spindle 5 is journaled at one end on a carriage 6 slidably mounted upon a guide rod 7 and a shaft 8. The spindle 5 carries a bevel gear 9 that is driven by a bevel gear 10 loose on rod 7 and compounded with a spur gear 11, also loose on rod 7, which is in mesh with a long gear 12 fixed to shaft 8. Gears 10 and 11 are free to be shifted on bar 7 lengthwise of the gear 12 while the parts are in motion. The shaft 8 is provided with a cone pulley 13 connected through a belt 14 with a cone pulley 15 on a shaft 16 from which cam shaft 1 is driven through the usual means, not shown. Shaft 8 carries a pair of fast and loose pulleys 131 coöperating with a driving belt 141 through which the machine is driven.

The carriage 6 is made with a hub 17 surrounding rod 7 and to this hub is clamped a collar 18 connected by a link 19 with an arm 20 having a hub 21 which carries also two other arms 22 and 23. The hub 21 is pivoted loosely upon a stud 24 fixed by a screw 25 in a lug formed on the housing 26 inclosing the cam drum 2. This housing 26 is fixed to the upright end frame 27 of the machine.

Fixed to the stud 24 by a screw 28 is an immovable bracket 29 having two arms to one of which is pivoted, at 30, a latch 31 normally supporting an arm 32 fixed to the usual stop motion shaft 33 so as to lock said shaft and arm against operating. When this latch 31 is swung out of engagement with arm 32 the shaft 33 is automatically operated to stop the machine. The means through which shaft 33 is operated and through which it acts to stop the machine is not shown in the drawings, but is as usual. On a stud 34 projecting from the other arm of the bracket 29 is loosely pivoted a thread-controlled, latch-operating drop 35, made with a hook 36 to engage the thread 37, a weight 38 to swing the drop around on stud 34 when the thread breaks and a finger 39 to act upon a stud 40 on the depending tail 31ª of latch 31 to swing the latter out from under arm 32 when the thread breaks and weight 38 swings the drop around on stud 34.

The thread 37 passes from the supply around two sets of pins 41 and 42 and over a stud 43 projecting from bracket 29, to the thread guide 3, the hook 36 engaging the thread 37 between stud 43 and thread guide 3. The pins 42 project from an immovable arm 44 fixed to bracket 29 while the pins 41 are mounted upon a tension lever 45 pivotally mounted upon the stud 43 and made with a substantially horizontal arm 46 provided upon its top side with a lengthwise channel in which is mounted a weight roll 47. The roll 47 is journaled on a stud carried at the free end of an arm 48 pivoted at 49 to a link 50 adjustably clamped to the arm 22 of lever 21 by a screw 51 passing through a slot in link 50. The lever 45 assisted by weight 47 tends to swing toward arm 44 and to cause the pins 41 to press against the thread 37 as shown in Fig. 1. As the winding of a cop progresses and the latter grows in diameter the speed at which the thread 37 travels past the pins 41 and 42 increases correspondingly which would result in a corresponding increase in the tension on the thread except that weight roll 47 is shifted toward fulcrum stud 43 by arm 22 as the cop grows thus progressively decreasing the effective pressure of weight 47 on lever 45 and thereby preventing the tension on the thread from increasing as its speed increases. This automatic adjustment of the weight roll 47 is effected by the swing of arm 22 which is produced by the growth of the cop being wound. That is to say, as the cop increases in diameter the spindle 5 and carriage 6 are shifted away from the thread guide 3 and this movement of carriage 6 acts through link 19 to swing arms 20 and 22, both of which project from hub 21, in a direction to carry weight roll 47 toward fulcrum stud 43 as the cop grows. To the arm 20 of hub 21 is adjustably secured a weight 54 which acts through arm 20, link 19 and carriage 6 to hold the cop yieldingly against the thread guide 3 so that the thread is pressed down into place by the thread guide as it is laid on the cop. This weight 54 is set or adjusted so that it exerts its maximum effect at the start of the winding of a cop and as the cop increases in size and arm 20 is swung toward the left, Fig. 1, the effective force of the weight is decreased and therefore the pressure of the cop against the thread guide gradually decreases as the cop increases in size.

The drop 35 provides for automatically stopping the machine when the thread breaks and in order to provide for automatically stopping the machine when the cop being wound reaches a predetermined size the latch 31 is provided with an arm 55 in the path of an adjustable screw 56 carried by the arm 23 of hub 21. When the arm 23 reaches the extreme of its movement that is occasioned by the growth of the cop the screw 56 lifts the arm 55 and the resulting drop of arm 32 stops the machine.

The operation is as follows: While the machine is at rest the operator places a cop tube or quill on the spindle 5 and then lifts the arm 32 upward to start the machine, the latch 31 swinging by gravity into place under the arm 32 and locking it elevated with the machine in motion. As the cop grows in size carriage 6 is forced thereby toward the left in Fig. 1 and through the connections above described the roll 47 is adjusted toward fulcrum 43 proportionately as the cop grows. Therefore the effective pressure of the weight on the lever is progressively decreased during the winding operation at the same rate that the cop grows in size, or at any desired rate for which it may be adjusted and in accordance with the increase of speed of thread 37. Therefore this relaxation of pressure on the tension lever 45 by the weight 47 permits said lever to adjust itself away from the pins 42 so that the tension on the thread 37 does not increase with the increasing speed of the latter. A distinguishing peculiarity of the mode of coöperation of the two sets of pins 41 and 42 is that the tension regulating effects are produced by a relative "scissors" like movement of the two sets whereby the pins start to pass out of contact with thread 37 at one end of the series and as the lever 45 continues to move outward the pins are progressively separated from that end toward the opposite end with the result that as the winding of the cop nears completion, some of the pins of both sets are out of contact with the thread entirely. The advantage of this is that less relative movement between the two sets of pins is necessary to secure a definite change in the tension effects of said pins than heretofore and the range of variation in tension is greatly increased over what has been possible heretofore.

What I claim is:—

1. In a winding machine of the character described, in combination, a thread guide; a winding spindle yieldingly held toward the thread guide and movable away from the latter as the cop grows in size; a pivotally supported tension lever provided with a set of thread engaging pins; a stationarily supported set of thread engaging pins coöperating with the pins of the tension lever; a weight adjustably mounted on the tension lever; and means connecting the weight with the winding spindle through which movement of the spindle away from the thread guide shifts the weight on the tension lever in a direction relatively to the fulcrum of said lever so as to decrease the effective force of the weight as the cop grows in diameter.

2. In a tension device for winding machines, a pair of tension members pivotally mounted with relation to each other; each member having a multiplicity of pins mounted upon a common support and each arranged with relation to the other, so that pins of each member will pass between the pins of the other member to form a sinuous, angular path for the thread; a lever connected at the pivoted end of a moving member of the pair and extending in the plane of movement; a movable weight mounted upon that lever and connections between the weight and a part of the winding machine moved by the growth of the cop, to shift the weight as the cop grows, to diminish the tension on the thread.

3. In a winding machine of the character described, in combination, a thread guide, a winding spindle yieldingly held toward the thread guide and removable away from the latter as the cop grows in size, a tension member, made up of two comb-like parts, one pivoted to the other at its upper end and movable in a vertical plane; a lever at the upper end of the moving member of the tension device extending horizontally in the plane of movement; a movable weight upon this lever; and means connecting the weight with the winding spindle, through which movement of the spindle away from the thread guide shifts the weight on the lever in a direction to decrease the effective force of the weight as the cop grows in diameter.

Signed by me at Westfield, Massachusetts, this 22nd day of December, 1911.

JOHN O. McKEAN.

Witnesses:
LESTER CAMPBELL,
J. A. MALLORY.